United States Patent
Opdam et al.

(10) Patent No.: US 6,705,043 B1
(45) Date of Patent: Mar. 16, 2004

(54) CLOSED MARKET GARDENING GREENHOUSE

(75) Inventors: Joannes Jozef Gerardus Opdam, Amsterdam (NL); Gilbertus Gualtherus Schoonderbeek, Utrecht (NL); Kornelis Blok, Houten (NL)

(73) Assignee: Ecofys B.V., Ultrecht (NL)

( * ) Notice: Subject to any disclaimer, the term of this patent is extended or adjusted under 35 U.S.C. 154(b) by 0 days.

(21) Appl. No.: 10/009,651

(22) PCT Filed: Jun. 9, 2000

(86) PCT No.: PCT/NL00/00402

§ 371 (c)(1),
(2), (4) Date: Mar. 14, 2002

(87) PCT Pub. No.: WO00/76296

PCT Pub. Date: Dec. 21, 2000

(30) Foreign Application Priority Data

Jun. 10, 1999 (NL) .................... 1012291

(51) Int. Cl.[7] .................... A01G 9/14
(52) U.S. Cl. .................... 47/17; 165/45
(58) Field of Search .................... 47/17, 18; 165/45

(56) References Cited

U.S. PATENT DOCUMENTS

| | | | | |
|---|---|---|---|---|
| 3,965,972 A | * | 6/1976 | Petersen | 165/45 |
| 4,108,373 A | * | 8/1978 | Chiapale et al. | 126/640 |
| 4,200,148 A | * | 4/1980 | Friefeld et al. | 165/10 |
| 4,237,859 A | * | 12/1980 | Goettl | 126/400 |
| 4,289,116 A | * | 9/1981 | Williams | 126/633 |
| 4,375,831 A | * | 3/1983 | Downing, Jr. | 165/48.1 |
| 4,448,237 A | * | 5/1984 | Riley | 165/45 |
| 4,476,921 A | * | 10/1984 | Stubbolo | 165/48.1 |
| 4,489,568 A | * | 12/1984 | Shapess | 62/324.1 |
| 4,567,939 A | * | 2/1986 | Dumbeck | 165/224 |
| 4,577,679 A | * | 3/1986 | Hibshman | 165/45 |
| 4,674,476 A | * | 6/1987 | Wilson | 126/591 |
| 5,046,551 A | * | 9/1991 | Davis et al. | 165/45 |

FOREIGN PATENT DOCUMENTS

| | | | | |
|---|---|---|---|---|
| DE | 26 20 218 A1 | 12/1977 | | |
| DE | 3108431 A | * 10/1982 | | F24J/3/04 |
| DE | 3312329 A1 | * 10/1984 | | |
| DE | 3632170 A1 | 4/1987 | | |
| DE | 3835284 A1 | 4/1990 | | |
| DE | 19836011 A1 | * 3/1999 | | |
| EP | 0 111 701 B1 | 8/1986 | | |
| EP | 0 121 558 B1 | 5/1988 | | |
| EP | 0 517 432 A1 | 12/1992 | | |
| FR | 2 510 732 | 2/1983 | | |
| JP | 59-170652 | * 9/1984 | | |
| NL | 1010134 | * 6/2000 | | |
| WO | WO98/38849 | 9/1998 | | |

* cited by examiner

Primary Examiner—Peter M. Poon
Assistant Examiner—Jeffrey Gellner
(74) Attorney, Agent, or Firm—Jeffrey D. Myers

(57) ABSTRACT

Market garden greenhouse system in which plant products can be cultivated, which market garden greenhouse is substantially not provided with ventilating openings, wherein the market garden greenhouse comprises: heat regulating means for regulating the beat in the greenhouse, which heat originates substantially from the solar energy which comes into contact with the market garden greenhouse; and/or a heating system, and/or air humidity regulating means for regulating the air humidity in the greenhouse.

9 Claims, 4 Drawing Sheets

CLOSED MARKET GARDENING GREENHOUSE

The present invention relates to a closed market gardening greenhouse and a method for controlling the climate in a closed market gardening greenhouse.

Cultivation under glass takes place worldwide with "open" greenhouses. Open greenhouses provide the option of ventilating the greenhouse air by means of ventilating windows. This has the advantage that when insolation is high the surplus heat and/or moisture can be removed in simple manner via ventilation. In the Netherlands it is necessary on a large number of days for the greenhouses to be ventilated for a number of hours.

Optimal culture conditions however require a good balance between insolation, air humidity, greenhouse temperature and $CO_2$ delivery. It is self-evident that the open greenhouse system cannot usually satisfy optimal culture conditions.

Optimal culture conditions for the greatest possible harvest for many crops are as follows:

Temperature between 18 and 24° C.

Air humidity between 70 and 90%

Concentration of $CO_2$: 1000 ppm.

From an energy viewpoint an open greenhouse system is not desirable.

The surplus heat in summer is after all removed by ventilation while in winter there is a heat demand.

Because an open greenhouse does not cool actively, the temperature is frequently higher than 24° C.

An open greenhouse is supplied with $CO_2$. This $CO_2$ is necessary for the growth of the crop.

Because an open greenhouse must be ventilated often to dispose of the surplus heat and moisture, the supplied $CO_2$ is hereby also lost.

In an open greenhouse the crop will be able to grow quickly particularly in the summer because of high insolation, even though cultivation conditions are not then optimal: too warm and too little $CO_2$. The great quantity of light is not used optimally, mainly because there is a shortfall in the concentration of $CO_2$.

An object of the present invention is to provide an improved market garden greenhouse.

According to a first aspect of the present invention a market garden greenhouse system is provided in which plant products can be cultivated, which market garden greenhouse is closed and substantially not provided with ventilating openings, wherein the market garden greenhouse comprises:

heat regulating means for regulating the heat in the greenhouse, which heat originates from solar energy and a heating system, and/or air humidity regulating means for regulating the air humidity in the greenhouse.

A closed greenhouse system according to the present invention makes it possible in principle to optimize the greenhouse climate. A closed greenhouse system according to the present invention is understood to mean a greenhouse without ventilating windows which can be opened.

In a closed greenhouse the heat and moisture will be removed without the $CO_2$ concentration being decreased.

With a rapidly responding climate control an optimal balance between the insolation, air humidity, greenhouse temperature and $CO_2$ delivery must be possible at any fluctuation in the insolation.

Advantages of a closed greenhouse according to the present invention are:

the consumption of primary energy (the greenhouse as (closed) solar collector must utilize the insolation to maximum effect) will, according to calculations, be a minimum of 40% lower than in a modern traditional "open" greenhouse.

higher cultivation yield because the cultivation conditions such as temperature, air humidity and $CO_2$ concentration can be better controlled and managed. On the basis of model predictions, it is the expectation that the cultivation yield will be a minimum of 20% higher than in a modern traditional open greenhouse.

the use of herbicides/pesticides can be reduced considerably because of the considerable decrease in the chance of crop diseases and infestations; and saving in water consumption (in a closed system there is the option of collecting and recirculating all the evaporation from the crop; a greenhouse normally uses 500–600 kg/m² annually).

it is expected that the moment of harvesting can be better controlled. It will be possible to respond better to the market. A higher price per kg of product can hereby be anticipated. The possible favourable financial consequences of the moment of harvesting are not included in this report.

A possible option for providing $CO_2$ to the greenhouse is the production of $CO_2$ in the greenhouse itself by means of a "bacteria-rich" ground.

For the combined heating and power option with electric heat pump a study of the possibilities for $CO_2$ storage is furthermore of importance for the use of the locally generated $CO_2$.

From the viewpoint of a renewable energy provision, a market garden greenhouse can be considered a solar collector.

For maximum use of the annual insolation the surplus radiated solar energy (in the form of sensible and latent heat) will be collected on a "warm" day and stored. Sufficient heat will have to be supplied from the store on a "cold" day.

Fluctuations in the energy demand within a day—caused by fluctuations in the outside climate—can also be compensated.

A stable inside climate requires a rapidly responding energy system.

The basis of the energy supply in the greenhouse system according to the present invention consists of a heat and cold-providing system in the form of a number of heat exchangers and air distribution units in the greenhouse. The heat exchangers have both a cooling and heating function. The air in the greenhouse is carried through the heat exchangers by means of fans; use can optionally be made of natural convection during heating.

Cooling of the Greenhouse System

The surplus heat is removed entirely to an aquifer in the summer. This takes place by active convection through heat exchangers. These heat exchangers are fed with cold water from an aquifer, see FIG. 1 wherein A to H are liquid flows (A and B are groundwater flows).

An aquifer is understood to mean a natural water source of often non-potable water which, stored in a sand layer, lies under the ground under pressure at a depth of roughly 80 m.

An aquifer is thus a kind of "underground" lake which cannot be termed "groundwater" since there is substantially no circulation of water in an aquifer.

Aquifers are often found in delta regions in North-West Europe.

The present invention preferably makes use of existing aquifers as energy store.

The aquifer can be limited in output capacity to the flow rate which can be processed by one doublet, consisting of one borehole for upward pumping of water and one borehole for downward pumping of water in a closed circuit.

The aquifer can be dimensioned such that the peak output of heat can be removed immediately.

By applying a day storage for both cold and warm water, the peak capacity for the cooling does not have to be extracted directly from the aquifer. In the night prior to a hot day a supply of cold water is stored which is large enough, together with the cooling from the aquifer, to remove the heat surplus at a high output during the day. The cold water extracts heat from the greenhouse and is then stored in a warm day buffer and in the following night removed to the aquifer. In this way the heat supply peak is removed sufficiently quickly and removed uniformly to the aquifer via buffering.

The day buffers can be embodied as two covered, uninsulated water basins such as are currently used as water store for watering. If necessary, these day buffers can also be placed underground. It is also possible to opt for a layered storage in one buffer.

The momentary heat surplus in the greenhouse can be removed in two ways:
    directly to the aquifer
    indirectly via day buffer to the aquifer.

A structural heat surplus in the aquifer can be removed in two ways:
    cooling with cooling tower
    supplying heat to third parties outside the greenhouse.

If a heat surplus occurs in the greenhouse, this heat will have to be stored in the aquifer. The quantity of heat to be stored determines the required storage capacity of the aquifer. This heat is used for heating in the winter.

In respect of the flow rate the aquifer has the smallest possible dimensions in order to keep investment costs as low as possible. This limits the storage capacity of the aquifer.

The maximum heat load can amount for a small number of hours in the summer to about 700 W/m$^2$ or 7 MW/ha. This amount of heat is extracted from the greenhouse by means of heat exchangers.

The load duration curve shows that the large heat surplus occurs for only a small number of hours. In practice the peak of insolation is usually already excluded by closing a screen in the greenhouse when insolation is high. However, the light incidence is hereby also reduced, and therewith the production. Reduction of the insolation, and therewith the peak of the cooling demand, results in a decrease of energy consumption.

Possibilities of removing the heat from the greenhouse are:

Direct storage in aquifer. The flow rate is a maximum of about 150 m$^3$/hour per pair of boreholes. At a temperature difference of 12° C. this produces power output of about 2.1 MW. The aquifer will preferably consist of one pair of boreholes and thereby have power output of about 2.1 MW. The use of two day buffers is therefore recommended.

Via day buffer to aquifer.

At higher insolation than the above stated 2.1 MW, the surplus heat can be stored temporarily in a heat buffer.

This heat buffer is situated with a cold buffer in a closed circuit. These buffers can be placed both below and above ground in the form of water basins or storage tanks. There is a buffer with cold water which is cooled with water from the aquifer. The flow rate from the cold buffer is sufficiently great to realize a cooling power output of 7 MW at a temperature difference of for instance 12° C. The pre-buffered quantity of cold water in this buffer and the continuous supply from the heat exchanger between aquifer and the buffers is sufficient to remove the whole heat surplus by cooling during a day with maximal insolation. The heated water is then stored in the warm day buffer. The water from this buffer is guided via a closed circuit through a heat exchanger where it relinquishes its heat to the cold water from the aquifer. The cooled water is stored in the cold buffer, the heated water is stored in the warm well of the aquifer. The size of the water buffers is determined by the daily heat surplus. From calculations based on hourly values of actual insolation, it is found that the heat surplus will amount to a maximum of about 200 GJ per day. It follows from calculations that about half thereof must be buffered, the other half already being removed to the aquifer during the day via the heat exchanger. At a temperature difference of 12° C. the volume of the buffers will each amount to about 2000 m$^3$ (for 1 ha. greenhouse). The warm water is pumped continuously through heat exchanger 8 (FIG. 1) to relinquish heat to the aquifer. The cold day buffer is refilled with the cooled water. This water is available the following day for cooling. During this day the empty warm buffer is then refilled with water which has extracted heat from the greenhouse. It can be deduced from the load duration curve that, of the 2645 hours with a heat surplus, cooling must take place with more than the capacity of the aquifer for about 35% of this number of hours (985 hours) The day buffers are used at least during these hours.

Removal of Structural Heat Surplus from the Aquifer

The surplus heat from the aquifer can be removed with a cooling tower. The warm water from the aquifer relinquishes heat via the heat exchanger to water which is cooled by the cooling tower. The water for cooling is brought into contact with ambient air by a spraying system. The ambient air has a lower temperature than the water for cooling and absorbs sensible and latent heat. The cooling water thereby cools to below ambient temperature and is fed back to the greenhouse where it once again absorbs heat. It is physically not possible to cool lower than the wet bulb temperature of the environment. Cooling in this manner is hardly worthwhile in the summer. In the winter however, this cooling method is worthwhile to cool the aquifer and to prevent a permanent warming of groundwater occurring. The surplus heat stored in the aquifer can also be removed by supplying it to other users outside the greenhouse.

The heat exchangers in the greenhouse can remove the heat surplus by cooling and simultaneously regulate the air humidity. The temperature of the supplied cold water is fixed at about 6° C. By regulating the flow rate of the water and of the greenhouse air through the heat exchanger, the quantity of removed heat and moisture (sensible and latent heat) can be controlled.

Heating of the Greenhouse System

Heating during the summer is provided by the warm water present in the day buffer and in the aquifer. Using a heat pump the temperature of the water from the day buffer and the aquifer is increased to about 40° C. The heat required for this purpose is extracted from the warm water. The cooled water is pumped into the cold day buffer or into the aquifer.

The power output required for heating can be supplied wholly by the aquifer with one doublet. By applying the day buffers as communicating vessels for cooling and heating, even if the heat surplus is small, an energy-saving can be expected on the auxiliary energy.

Heating of the greenhouse is provided by the same heat exchangers as those used for the cooling. The required peak output for heating is lower than the peak output for cooling and is about 30% of the cooling power output. About half this output can be delivered by the heat pump (basic load) and half by the gas boiler (peak load). Another division of the basic load and the peak load of the heat demand is also possible.

The Heat Surplus on Annual Basis

On the basis of the heat demand of the greenhouse and the insolation, there is a surplus of heat on an annual basis. In the summer this heat is stored in the aquifer. In the winter the heat demand is not large enough to cool the whole aquifer to the original temperature. In order to prevent a structural warming of the aquifer occurring, the annual surplus of heat is preferably cooled with a cooling tower or supplied to third parties. The output of this cooling tower is preferably not larger than the output the aquifer can supply.

The cooled water from the aquifer is pumped to the cold well of the aquifer.

In the winter situation there is then substantially no buffering required.

When mains electricity is used, as much use as possible can be made of electricity during the night in order to keep energy costs as low as possible.

Greenhouse Climate

The climate in a greenhouse is determined by the insolation, the temperature, the relative air humidity and the $CO_2$ concentration.

The insolation on the greenhouse cannot be influenced. The net insolation (the incoming insolation less the shadow of the greenhouse construction) must be as high as possible because the growth of many types of crop is proportional to the light incidence.

In Dutch conditions there is usually too much heat and too little light in the greenhouse. Ventilating windows are absent in a closed greenhouse so that there are fewer obstructions for the incident radiation. The amount of light available for growth is therefore slightly greater than in a traditional greenhouse.

The temperature in the closed greenhouse will preferably be between 20° C. and 24° C.

The highest possible temperature will be chosen during days with a heat surplus. This may be favourable for the growth of the crop and increase the transmission losses to the environment so that less heat has to be removed via the heat exchangers. The capacity of the heat exchangers moreover increases with an increasing temperature difference between the cold water from the aquifer and the air in the greenhouse.

The air humidity can preferably lie between about 70 and 90%. This is regulated by cooling the air in a heat exchanger to below the dewpoint. If in addition to dehumidifying there is also a heat demand, this heat can delivered directly by the heat exchanger. Latent heat is herein thus converted into sensible heat without heat being stored in the aquifer or the day buffer.

Pumping warm water downward to the aquifer and then pumping it back up again for heating purposes is preferably avoided.

The crop consumes considerable quantities of $CO_2$. In contrast to the traditional "open" greenhouse, it is possible in a closed greenhouse to always set an optimal $CO_2$ of about 1000 ppm.

The climate in a closed greenhouse can be managed much better than the climate in a traditional open greenhouse. The quality of the crop and the production can hereby be enhanced. An additional advantage is that the moment of harvesting can be influenced so as to choose a favourable time for delivery to the market.

An efficient regulation of cooling, heating, dehumidification and $CO_2$ delivery is necessary in order to enable control of the climate in the greenhouse.

When there is a demand for heat in the greenhouse the air in the greenhouse is heated via the heat exchangers and a pipe system with warm water. The heat exchanger is fed with heat from the warm day buffer or the aquifer. This heat has too low a temperature for direct use and is increased in temperature by a heat pump to a maximum of about 40° C. The lower this temperature, the higher the efficiency of the heat pump will be.

The heat can be generated by both active and passive convection. In passive convection, therefore without forced ventilation, no auxiliary energy is required for the air flow through the heat exchanger. The specific heat generation per m or $m^2$ heat exchanger is however smaller than in active convection. Active convection during heating is assumed in the calculations of the total energy consumption. The electrical auxiliary energy amounts to 3% of the amount of exchanged heat.

The power output which the aquifer produces is roughly 2.1 MW, the heat pump adding about 500 kW thereto so that roughly 2.6 MW is available. This output is sufficient for the peak demand for heat in the greenhouse. If necessary, the warm day buffer can be used as heat source. This has the advantage that the amount of energy for pumping the water is lower than when an aquifer is used. If the heat pump is driven with a gas motor, the cooling water from the gas motor is also available for heating the greenhouse The temperature of this cooling water is about 80° C. and thereby suitable for heating via a network of pipes in the greenhouse. This can be a network on the ground which also has the function of rails for carts used for harvesting.

Dehumidification

Dehumidification is necessary to remove the moisture produced by the crop.

In the present invention two methods of moisture removal are recommended:
- via condensation on the greenhouse deck (passive dehumidification)
- via condensation on a cold surface (active dehumidification).

The dehumidification via the greenhouse deck costs no energy and can hardly be influenced.

A form of active dehumidification is necessary to enable control the air humidity. The heat exchangers are capable of removing sufficient moisture.

If there is a simultaneous moisture surplus and heat demand, it must be possible to convert latent heat into sensible heat. This process can take place with the heat pump. A part of the heat exchangers will cool and dehumidify the air while another part of the heat exchangers carries the extracted heat back into the greenhouse. Depending on the conditions in which this dehumidification takes place, this costs about 0.7 MJ/kg water.

$CO_2$

The crop in the greenhouse consumes large quantities of $CO_2$. The ideal concentration for the growth of the crop is about 1000 ppm, this concentration being particularly necessary at high insolation. The natural concentration in the outside air is about 350 ppm. In a traditional open greenhouse $CO_2$ is supplied but the concentration only increases in the most important growth period, the summer, to about 500 ppm. Addition of more $CO_2$ is pointless because ventilation takes place during high insolation to remove the surplus heat and moisture and the extra delivered $CO_2$ thereby also disappears.

In a closed greenhouse according to the present invention the concentration of $CO_2$ can however be brought to the desired level.

For tomato for instance a typical value of the $CO_2$ consumption is 2 kg $CO_2$ per kg dry matter product. The yield amounts to about 3–6 kg $m^2$/year dry matter or a $CO_2$ consumption of 6–12 kg $m^2$/yr. Assuming a loss of 50% (first order estimate) about 12–24 kg $CO_2/m^2$/year will have to be delivered.

Another possibility for delivery of $CO_2$ is local production of $CO_2$ by bacteria, for instance in the greenhouse soil.

Quality of the Greenhouse Air

The closed greenhouse is not ventilated with outside air. Some additional ventilation may be necessary to refresh the "contaminated" air in the greenhouse with "clean" outside air. In this controlled ventilation the outside air must be supplied via filters. The chance of diseases through fungi and pollen is hereby greatly reduced.

The invention will now be further elucidated on the basis of the following specific description with reference to the accompanying tables and,figures.

FIG. 1 shows a schematic flow diagram of a market garden greenhouse system according to the present invention during the cooling operation.

FIG. 2 shows a schematic flow diagram of a market garden greenhouse system according to the present invention during the heating operation.

FIG. 3 shows a cross-section of the installation for distributing cold and heat in the closed greenhouse according to the present invention.

FIG. 4 shows a schematic flow diagram of the installations in the greenhouse according to the present invention.

Figure 1:
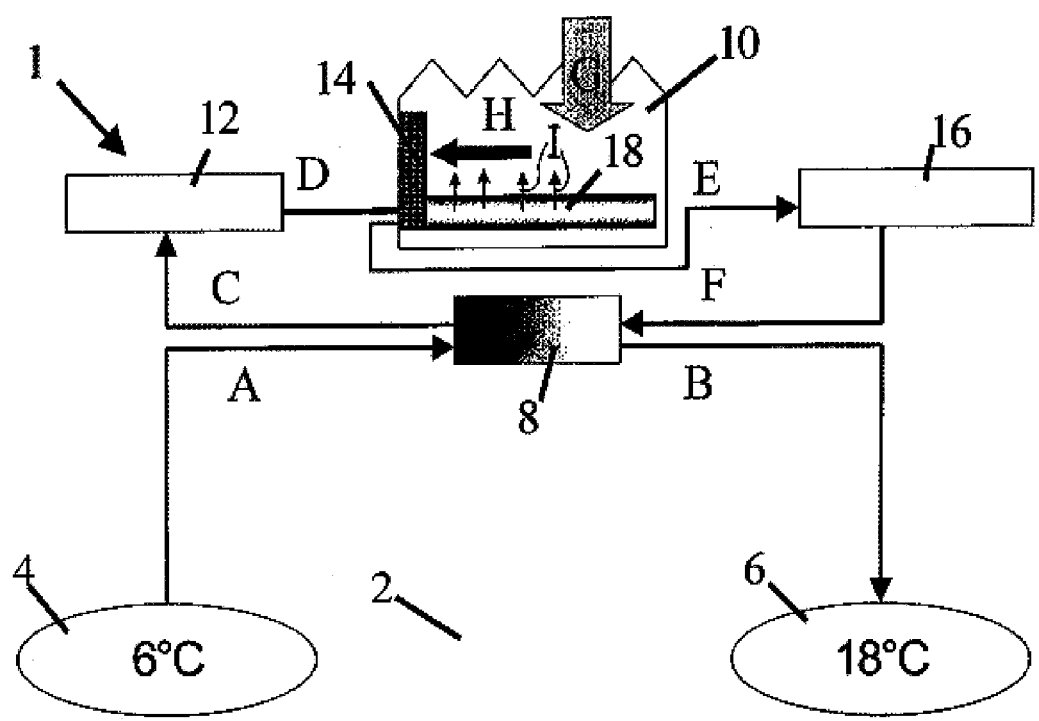
FIGS. 1–4 show the principle of the energy provision to a market garden greenhouse system.

The energy provision can be sub-divided into the supply of cold and the supply of heat.

The system 1 according to the present invention comprises an aquifer 2. One component of the energy provision is the storage of cold and heat in an aquifer.

At a temperature difference of 12° C. (cold source 6° C., warm source 18° C.) and a flow rate of 150 $m^3$/hour, power output amounts to 2.1 MW. This is the nominal cooling capacity of the aquifer. From the cold source 4 the cold water flow A passes via the separating heat exchanger 8 into a warm water flow B, and this heated water is stored in heat source 6. Heat exchanger 8 provides the exchange of heat between the flow AB thereunder and the liquid flow CF thereabove.

The circuit CDEF is formed by a buffer 12 with cold liquid, for instance water of about 6° C., a liquid flow D between the cold day buffer 12 and a heat exchanger 14 in greenhouse 10, the liquid flow E from heat exchanger 14 to the warm day buffer 16 and the flow F between day buffer 16 and heat exchanger 8. Cooling situation (see FIG. 1)

The aquifer 2 consists of a cold source 4 and a warm source 6 of water.

The temperature of cold source 4 is between 2 and 10° C. and that of warm source 6 between 14 and 22° C.

In order to keep costs as low as possible, one borehole is made per source. The depth of the boreholes depends on the location and lies between 10 and 300 meters. The water from the cold and warm sources is mutually connected via a heat exchanger 8.

There is a closed circuit (A, B) between the two sources 4, 6 so that the groundwater does not come into contact with the outside air.

The heat generated in greenhouse 10 by the insolation G must herein be removed.

Operation is as follows. A day buffer 12 is filled with cold liquid. This liquid is pumped via D to heat exchanger 14.

The temperature of the air in greenhouse 10 is 20° C. or higher due to the insolation G of the sun. Heated air H is carried through heat exchanger 14 and relinquishes heat to the cold liquid D.

Liquid D heats up to about 18° C. and passes via E to the warm day buffer 16.

The day buffers 12, 16 can, if desired, also be placed in the closed circuit (A,B) After heat exchanger 14 the cold air is carried into the greenhouse as an air flow I by air distribution hoses 18.

The amount of liquid in day buffer 12 is sufficient together with flow C to fully absorb the supply of heat in greenhouse 10 and to remove it the warm day buffer 16. After a hot day the warm day buffer 16 is wholly filled with warm water and the cold day buffer 12 is empty.

In order to have enough cold liquid in the cold day buffer 12 for the following hot day, the liquid from the warm day buffer 16 is guided via F to heat exchanger 8. Here the warm liquid F relinquishes heat to the cold water coming via A from cold source 4. The flow A is heated in heat exchanger 8 from about 6° C. to 18° C. and stored via B in warm source 6.

The heat from liquid flow F is transferred by heat exchanger 8 to AB and the cooled flow C is stored in day buffer 12. When insolation begins the cold day buffer 12 is wholly filled with cold liquid.

In a twenty-four hour period a quantity of heat has to be removed from greenhouse 10. The cold day buffer 12 preferably has a volume corresponding to a part of the heat for removing (roughly half). The remaining part of the heat is removed by pumping extra cold from cold source 4 via A, heat exchanger 8 and C to the cold buffer 12. This cold water is immediately available and is not buffered in day buffer 12.

The total cooling capacity is thus formed by the cold available in day buffer 12 and the continuously supplied cold from source 4 via A, heat exchanger 8 and C. Cold flow D is built up from the continuous flow C via day buffer 12 and the emptying of day buffer 12.

The same applies for flow E, which is split into a continuous flow F (same flow rate as C) and filling of buffer 16 via E.

When the cooling demand begins in the morning the cold day buffer 12 is first drawn on. Day buffer 16 is filled via D, heat exchanger 14 and E.

A part of the flow is cooled via F in heat exchanger 8 and becomes available again in greenhouse 10 via C, day buffer 12 and D in heat exchanger 14.

Figure 2:
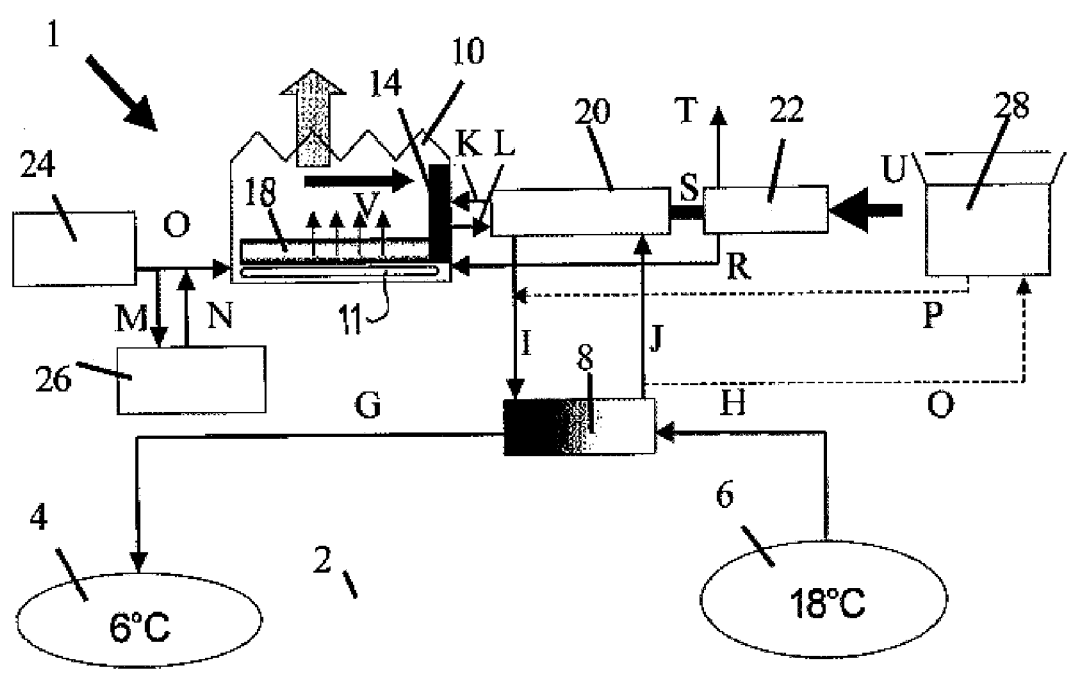

Heating Situation (see FIG. 2)

During heating of greenhouse 10 a large part of the liquid flows run in opposing direction to that during cooling.

Buffers 12 and 16 are not necessary for the heating.

There are three heat flows to greenhouse 10. These are:

From a heat pump 20 via K.

From a gas motor 22 via R.

From a gas boiler 24 via O.

The heat source 6 of aquifer 2 provides warm water via H to heat exchanger 8. The heat from H is transferred to flow J. The cooled water from heat exchanger 8 passes via flow G to cold source 4. The warm liquid, flow J, is the heat source for heat pump 20. This heat pump 20 increases the temperature from about 18° C. to about 40° C.

This heat is relinquished via flow K to a heat exchanger 14. The cooled liquid from heat exchanger 14 returns via flow L to heat pump 20. The drive of the heat pump is not related to the type of motor or type of energy.

Heat pump 20 is driven by gas motor 22 via a mechanical or electrical connection S. This gas motor 22 provides mechanical power via S to heat pump 20 and warm cooling water (50 to 90° C.) via R to greenhouse 10. A small part of the heat is lost via T.

Gas motor 22 is fed by a gas flow U.

Gas boiler 24 provides heat via O if the heat demand (W) is greater than the power output in K and R of respectively heat pump 20 and gas motor 22. Gas boiler 24 provides warm water with a temperature of about 50 to 90° C. to greenhouse 10. If necessary, heat from gas boiler 24 can be buffered via flow M in a heat buffer 26. This heat is generated to greenhouse 10 via N.

The surplus heat from greenhouse 10 is stored in source 6 in aquifer 2.

During heating of greenhouse 10 this heat is relinquished to heat exchanger 8. If the annual heat demand of greenhouse 10 is less than the stored quantity of heat in source 6, extra cooling of source 6 and storage of the cold in source 4 are necessary. In this manner sufficient cold is once again available for a following warm season from cold source 4 to cool the greenhouse 10. Additional cooling takes place with a cooling tower 28. Warm water H from source 6 relinquishes heat to flow Q via heat exchanger 8. The temperature of the water Q is decreased in cooling tower 28 and the cold is relinquished to G via flow P and I via heat exchanger 8. The cold is stored in source 4.

Cooling tower 28 is optional and has no direct influence on the climate control in greenhouse 10. The surplus heat from source 6 can also be used for instance to heat another greenhouse or for other users.

Figure 3:
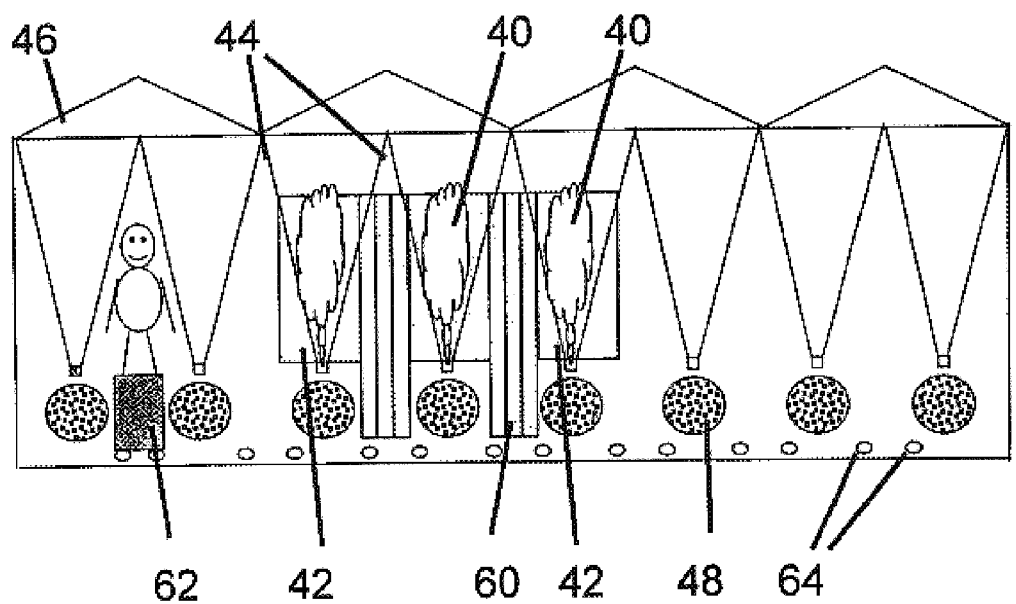

FIG. 3 shows a schematic cross-section of the greenhouse.

Figure 4:
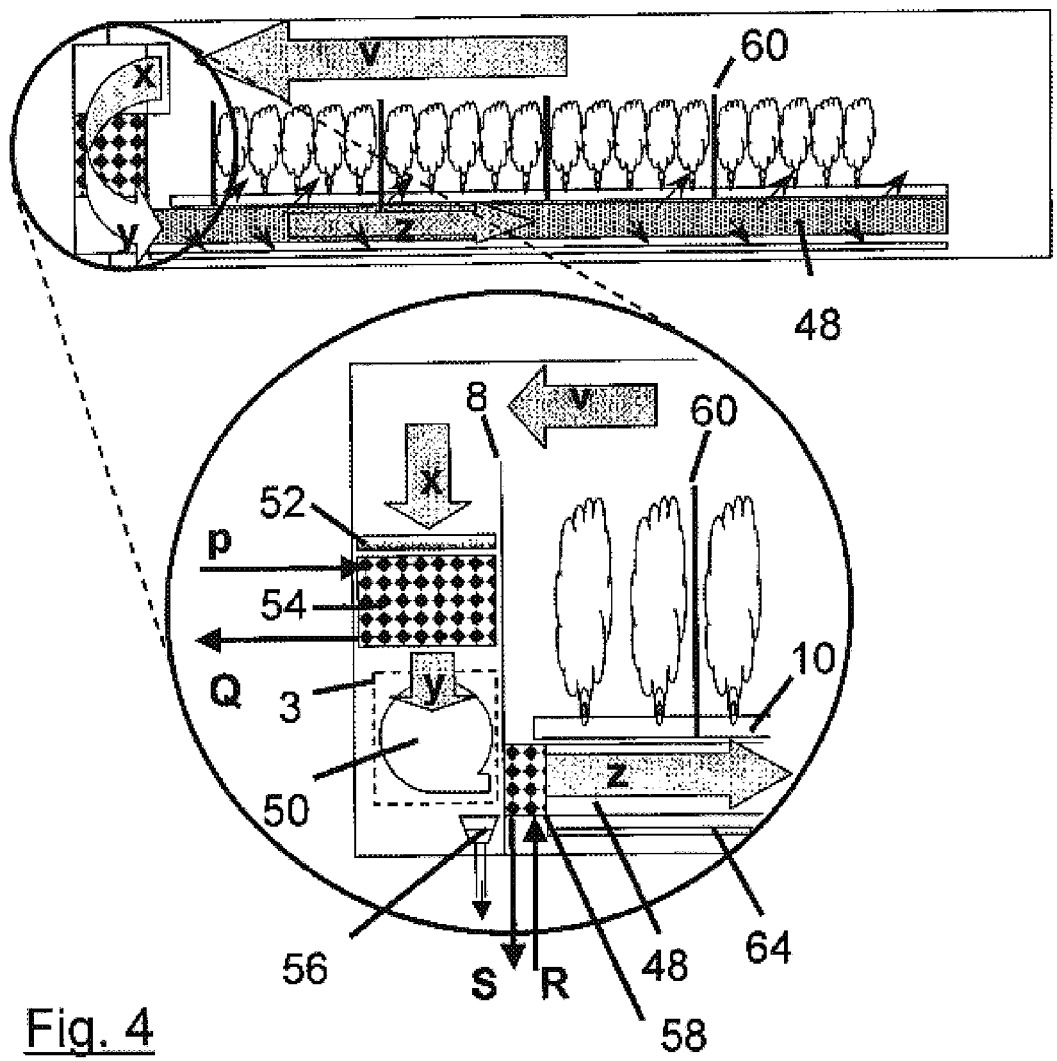

FIG. 4 shows the details of the installations in the greenhouse in a lengthwise section.

FIGS. 3 and 4 show parts of the installation for the air distribution in the greenhouse. The crop 40 hangs in a culture gutter 42 from cables 44 on the roof 46 of greenhouse 10. Air distribution hoses 48 are arranged under culture gutters 42.

An air distribution hose 48 is an air-permeable material (porous or with holes) wherein the opening is closed on one side and connected on the other side to an air-supply machine such as for instance a fan 50 (see FIG. 4). Owing to the overpressure provided by fan 50 the air-permeable material will begin to swell to a cylinder shape. The supplied air leaves the air distribution hose through the holes or the porous material.

During the cooling situation the air is heated in the greenhouse. Fan 50 draws this air via V and X through a filter 52 through a heat exchanger 54. In heat exchanger 54 the air flow X is cooled and dehumidified to air flow Y. Condensation water is collected in a vessel 56 and drained.

The dehumidified cool air is blown by fan 50 through a heat exchanger 58 into air distribution hose 48.

Heat exchanger 58 only operates if heating is necessary. In the case of dehumidification only, the heat exchanger 58 can bring the cooled air back to temperature.

Heat exchanger 54 is fed with cold water via P from cold buffer 12 (FIG. 1). A liquid flow Q from heat exchanger 54 runs to the warm day buffer 16.

During the cooling operation, when there is a large heat supply through insolation, a high circulation flow rate of the air in greenhouse 10 will be necessary to cool the air. The air warms up and will rise. It follows from calculations that a horizontal air flow results between the crop 40 at a height of 1–2 meters of comparatively cool air in the direction of the air treatment unit.

This is not the intention since air is then removed with too low a temperature. In order to obstruct this "spurious draught" flexible transparent partitions 60 are placed perpendicularly of the air distribution hoses at distances to be determined (see FIGS. 3 and 4), which form a barrier to the horizontal air flows. Between the crop these partitions 60 can take a rigid form, while the parts above the walkways take a flexible form so that staff and wagons can pass through.

During the heating situation the heat is provided by heat pump 20, gas motor 22 and, in the case of a high heat demand, also by gas boiler 24.

The heat from heat pump 20 is released at a temperature of about 40° C. or lower. This heat can be supplied to the greenhouse in two ways.

1) The heat is supplied in the liquid flow P to the heat exchanger 54 and via R to heat exchanger 58 (FIG. 4). The air X is drawn through a filter 52 and takes up heat in heat exchanger 54. The heated air Y is blown by fan 50 through heat exchanger 58 as air flow Z into air distribution hose 48.

The cooled liquid flows Q and S return to heat pump 20.

2) The heat is carried into heating pipes 64.

The heat from gas motor 22 and gas boiler 24 has a high temperature. This heat can be supplied in the same two ways to greenhouse 10.

A preferred method is to provide the heat to heating pipes 11 (FIG. 2). It is also possible to supply this heat to heat exchangers 54 and 58 (FIG. 4).

Heat Pump

A choice can be made from different types of heat pump. A compressor heat pump can be used with electric or gas motor. A gas-fired absorption heat pump can also be applied. The possibilities and properties of these systems are shown in the table below.

TABLE 1

| Type of heat pump and characteristics | | | |
| --- | --- | --- | --- |
| Type heat pump | Drive | Energy carrier | Primary Energy Ratio (PER) |
| Compressor[1] | Electrical | Electricity | 250%[2] |
| Compressor[1] | Gas motor | Gas | 250%[3] |
| Absorption | Gas | Gas | 150% |

[1]SPF = 5
[2]generating efficiency of electricity = 50%
[3]proportion electricity 40%, proportion heat 50%, losses 10%.

If a compressor heat pump is used, the SPF will be about 5. On the basis of the future central generating efficiency of electricity of 50%, the efficiency on the Primary Energy Ratio (PER) of a compressor heat pump will be about 250%. The compressor heat pump can also be driven by a gas motor (WKK). At the present generating efficiency of electricity and heat, the PER will also be about 250%. With the use of a gas-fired absorption heat pump the PER will amount to about 150%.

The different heat pumps have a number of specific advantages and disadvantages. These are summarized in the table below.

TABLE 2

Typical advantages and disadvantages of different heat pumps.

| Type of heat pump | Drive | Advantage | Disadvantage |
|---|---|---|---|
| Compressor | Electrical | Relatively lower investment | High energy costs because mains electricity is used |
| Compressor | Gas motor | Lower energy costs through use of natural gas | Relatively high investment |
| Absorption | Gas | Clean combustion | Energy-saving is lower due to lower efficiency of heat pump |

Electrical Heat Pump

The COP of the heat pump is calculated on the basis of 50% of the theoretical value (the Carnot efficiency)

$$c_{carnot} = T_{low}/(T_{high} - T_{low})$$

The COP of the heat pump is therefore greatly dependent on the temperature of the evaporator and the condenser. The design conditions of these temperatures are respectively 6° C. and 40° C. The Carnot efficiency is then 9.6, and calculations are made with 50% of this value. The heating output and the associated feed temperature and COP can be calculated per hour. All COPs are then weighted and added up to heat demand. The SPF follows herefrom. Because the heat demand is often lower than the design output, the SPF is higher than the COP under design conditions. In those cases where the heat demand is higher than the design output, the feed temperature will be higher and the COP lower. It is the intention that at a high heat demand a gas boiler be employed to provide the extra heat.

The heating can also take place by free convection along a warm convector. The use of forced ventilation during heating increases the efficiency of the heat exchange. In the case of equal heat generation either a smaller heat exchanger can thereby be applied or heat can be exchanged at a lower temperature.

The lower the feed temperature of the convector, the higher the COP of the heat pump can be. Exact dimensioning and embodiment will have to worked out at a later stage. For the moment a choice has been made for forced ventilation during cooling and heating.

The heat exchangers are designed for the maximum cooling demand which will only occur a small number of hours per year. When the heat exchangers are used for heating, preferably only the basis of the heat demand will be covered. At a greater heat demand a gas boiler is for instance employed. The system is then used at a lower output. The variation in the output during cooling and heating can be achieved by changing the water flow and/or the air flow through the heat exchangers. Frequency-controlled fans are preferably applied for this purpose so that the efficiency remains high at partial load. During heating using a heat pump it is also possible to decrease the output by decreasing the feed temperature so that the efficiency of the heat pump increases.

Active dehumidification via a cold surface costs energy because the condensation heat must be removed together with sensible heat. This heat can be removed by:
 the heat pump 20 (FIG. 2)
 cooling by means of aquifer 2 (FIG. 2).

In both cases it is essential that by means of active convection moist air be removed from the greenhouse through a cold heat exchanger. Calculations show that this auxiliary energy is approximately the same for both dehumidification methods and amounts to about 0.8 MJ/kg water.

When there is a heat surplus in the greenhouse, there is no point in feeding the latent heat back into the greenhouse as sensible heat. Dehumidification with cold water from an aquifer will only demand the auxiliary energy needed to pump the water. An average value of the auxiliary energy required is 4% of the pumped quantity of heat. Condensation of 1 kg water produces 2.3 MJ heat. If the auxiliary energy amounts to 4%, this corresponds to 0.1 MJ/kg water.

The inventors have calculated on the basis of a closed greenhouse from which no moisture is removed by ventilation. The basic assumption is the water consumption of tomato, which is 640 kg/m$^2$/year. A part of this will condense on the greenhouse deck.

In a traditional greenhouse with tomatoes as crop, the removal through condensation on the greenhouse deck amounts on average to about 20 gr/m$^2$/hour, or 175 kg/m$^2$/year. In a closed greenhouse according to the present invention is assumed the same quantity of removal by condensation on the greenhouse deck. A further 465 kg/m$^2$/year (=640−175) must therefore be removed. A large part hereof is removed when there is no heat demand. At a rough estimate this is about 75% or 350 kg. This requires 0.1 MJ/kg H$_2$O of auxiliary energy. The remaining 115 kg is removed while there is also a heat demand. The auxiliary energy required for this purpose amounts to 115 kg/m$^2$/year ×0.8 MJ=92 MJ/m$^2$/year or 920 GJ/ha/year. An advantage of a closed greenhouse over an open greenhouse is that no water is lost through evaporation. The water which is taken up by the crop and which evaporates again will be recovered by condensation on the greenhouse deck and in the heat exchangers. Only the water stored in the crop has to be supplied externally. This is of particular interest for regions with inadequate precipitation and use of fossil groundwater.

There is an annual heat surplus. It is not the intention that the ground be permanently warmed. It is therefore necessary for an additional cooling to take place.

A solution herefor is to cool with an evaporation cooling tower. The water for cooling is cooled to slightly above the wet bulb temperature of the environment. The cooling power output of cooling tower 28 (FIG. 2) is no greater than the output the aquifer can process. In this manner the aquifer can be cooled in a closed circuit and buffering outside the aquifer is not necessary.

The (cold and warm) day buffers can take both an underground and above-ground form. The least expensive solution is to apply two water basins (one cold and one warm), each having a volume of about 2000 m$^3$. These basins can be covered to prevent contamination and evaporation. Such a basin will not be insulated. It is also possible to apply underground storage or to store the heat and cold in a layered store.

The heat loss in the warm basin through convection, evaporation, transmission and radiation is an average of about 16 GJ/m²/day. The water can hereby fall a maximum of 2° C. in temperature per twenty-four hour period.

Through insolation about 18 MJ/m²/day enters the cold basin. At a depth of 2 meters this is 2000 liters of water per m². The water can hereby rise a maximum of 2° C. in temperature per twenty-four hour period.

The estimated temperature changes per twenty-four hour period are large enough to justify a covering. In the case of the "warm" day buffer particularly the loss through evaporation is hereby reduced. The total heat loss is roughly halved. In the case of the "cold" day buffer it is expected that a greater part of the heating is prevented.

Power Output Calculation

Heating
 with the greenhouse deck as will be used in this greenhouse the maximum heat demand is 220 W/m² or 2.2 MW/ha. About half of this output, the basic heat demand, will be supplied by a heat pump. The division of supply of heat by the heat pump and the gas boiler is not fixed.

Heat Pump
 Electrical Compressor Heat Pump
 The maximum heat demand of for instance 1100 kW is supplied at a feed temperature of about 40° C. The COP is then 4, the provided power output of the heat pump is 275 $kW_{electric}$.
 Gas Motor With Electrical Heat Pump
 At an electrical efficiency of 40%, a thermal efficiency of 50% and a COP of 4.0, the provided power output of the gas motor will be about 225 $kW_{electric}$ (heat pump delivers 225×4=900 kW heat. At 225 $kW_e$ the energy content of the gas is 225/0.4=563 kW, at a thermal efficiency of 50% the heat from the cooling water amounts to 280 $kW_{th}$. The total heat supply is thereby 900+280=1180 $kW_{th}$).
 Gas-Fired Absorption Heat Pump
 At a thermal output of 2200 kW and a PER of 150% the heat pump demands 1470 kW heat which is supplied by natural gas.
 Gas Boiler for the Peak Demand
 The gas boiler provides the heat if the heat demand is higher than about 50% of the peak demand. The power output of the gas boiler hereby lies at around 1100 kW.

Cooling
 The maximal cooling demand amounts to 700 W/m² or 7 MW/ha. 18.200 JG/ha heat is removed.

Dehumidification
 The dehumidification output of the heat exchangers is about 6000 kg/ha/hour under design conditions. The dehumidification capacity is 600 g/m²/hour. This is roughly the same as the maximal evaporation which can occur in a greenhouse with tomato.

Aquifer
 Embodied in the form of a doublet (two boreholes). The design flow rate is 150 m³/hour. At a temperature difference of 12° the power output is 2.1 MW. The aquifer supplies about 18,200 GJ cooling in the summer and, at a storage efficiency of 90%, about 16,400 GJ of heat in the winter. A part of the heat is used to heat the greenhouse, the rest is removed by cooling with a cooling tower, or supplied to a heat-demanding party in the vicinity. After heat extraction it is pumped as cold water into the aquifer. The number of full load hours amounts for both the cooling and the heating to about 2500 hours per year, a total therefore of 5000 hours.

TABLE 5

Energy flows in different types of heat pump

Cooling demand greenhouse: 18,200 GJ
Heat demand greenhouse: 15,800 GJ

| Type of heat pump | Aquifer (GJ/year)[1] | Heat pump (GJ/year) | Cooling tower (GJ/year) |
|---|---|---|---|
| Electrical heat pump | 12200 | 3100[2] | 4100 |
| Gas motor heat pump | 9200 | 6200 | 7200 |
| Gas-fired absorption heat pump | 5200 | 10300 | 11200 |

[1]efficiency of storage in aquifer is 90%
[2]electrical energy, primary energy consumption is 6200 GJ/year Table 5 shows that the electrical heat pump extracts the most heat from the aquifer. The additional cooling by the cooling tower is relatively small. With a gas-fired absorption heat pump this is precisely the reverse, the contribution from the aquifer being relatively small while much heat must be removed via the cooling tower.

In the case a gas motor is used with electrical heat pump the heat flows lie between these two extremes.

Day Buffers
 The two day buffers each have a volume of about 2000 m³ (for 1 ha. greenhouse). The cooling demand of the greenhouse amounts to a maximum of 7 MW. At a temperature difference of 12° C., this requires a flow rate of 500 m³.

Cooling Tower
 The aquifer stores the heat surplus in the summer. If possible, as much heat as possible is already removed by cooling in the summer period during cold nights. The heat surplus in the aquifer after the summer will be removed by cooling during the winter. The heat surplus depends on the type of heat pump used and amounts to about 4,000 to 11,000 GJ/ha (see table 5).

Cooling takes place with a cooling tower under the following conditions:
 $T_{supply}$: 18° C.
 $T_{drain}$: 6° C.
 Cooling takes place when the wet bulb temperature ($T_{nb}$) is 3° C. or lower. This occurs about 18% of the time, or 1613 hours per year. The maximal cooling power output may not be greater than the power output of the aquifer (2.1 MW). In this way about 12,000 GJ can be removed by cooling. This is sufficient to enable removal by cooling of the heat surplus from the aquifer when any type of heat pump is used.

The cost of such a cooling tower amounts to about f 50,000.-/MW. The energy consumption is 1% of the cooling power output.

Energy Consumption
 There now follows a comparison between the energy consumption in a reference greenhouse and a closed greenhouse with climate control as proposed in this report.

The energy consumption is calculated on the basis of an average climate year (TRY De Bilt). The annual heat and cooling demand is calculated on the basis of a number of specifications (see table 5). These heat and cooling demands are used as basic premise in calculating the energy flows for all concepts, with the exception of the reference situation.

Reference Greenhouse
 Cooling is provided by ventilation via air windows. This does not cost any auxiliary energy.
 Heating is provided by a heat network with a power output of 2200 kW.
 The ventilation provides cooling of the greenhouse.

Dehumidification takes place by ventilation and condensation on the greenhouse deck.

$CO_2$ is delivered by burning natural gas. Outside the heating season natural gas is burned for this purpose and the released heat is stored in an insulated day/night buffer. The extra gas consumption for the delivery of $CO_2$ is set at 10 $m^3/m^2/year$. No assimilation lighting is applied.

Closed Greenhouse According to the Present Invention

The starting point in the closed greenhouse is the same type of greenhouse deck and screen as in the reference greenhouse. Because the air windows and the associated operating rods are absent, the light access is slightly higher than in the reference greenhouse. The air distribution units (particularly the air distribution hoses) are placed in or on the ground of the greenhouse so that they do not influence the light incidence.

In the calculation of the energy consumption a single glass roof is assumed, and future greenhouse decks re thus not yet anticipated.

TABLE 6

Basic assumptions for the reference open greenhouse and the closed greenhouse

| Insulation of greenhouse deck | Reference greenhouse | Closed greenhouse |
|---|---|---|
| Roof without screen | 8 $W/m^2K$ | 8 $W/m^2K$ |
| Roof with screen | 5 $W/m^2K$ | 5 $W/m^2K$ |
| Walls | 5 $W/m^2K$ | 5 $W/m^2K$ |
| Light access | 70% | 75% |
| Screen closed | Insolation < 222 $W/m^2$ | Insolation < 222 $W/m^2$ |
| Screen open | Insolation > 222 $W/m^2$ | Insolation > 222 $W/m^2$ |
| Efficiency boiler | 100% o.w. | n.a. |
| Primary energy consumption | 62.1 $m^3/m^2/year$ | See table 7 |

For the closed greenhouse the additional assumptions are formulated:

Electric compressor heat pump: SPF=5
Efficiency central generation of electricity: 40%
Efficiency generation of electricity WKK: 40%
Gas-fired absorption heat pump: PER=150%
Volume day buffer: 2×2000 $m^3$ Table 7 shows the energy consumption in the closed greenhouse compared to that in the traditional greenhouse.

Calculations have been made for three different energy provisions for the supply of heat to the closed greenhouse. These are:

Compressor heat pump with mains electricity;
Compressor heat pump with gas motor and generator;
Absorption heat pump with natural gas as heat source.

TABLE 7

Energy consumption of the closed greenhouse for three configurations of heat pump; in relation to the energy consumption in a traditional open greenhouse

| | Electric heat pump Elect. | | Heat and power + heat pump Elect. primary | | | Gas-fired absorption heat pump Elect. primary | | |
|---|---|---|---|---|---|---|---|---|
| Cooling (GJ/ha/year) | | | | | | | | |
| Pumping up cold groundwater | 428 | 8% | 428 | 856 | 8% | 428 | 856 | 6% |
| Active convection for heat exchange | 364 | 6% | 364 | 728 | 6% | 364 | 728 | 5% |
| Sub-total | 792 | 14% | 792 | 1584 | 14% | 792 | 1584 | 10% |
| Heating (GJ/ha/year) | | | | | | | | |
| pumping up warm groundwater | 310 | 5% | 310 | 619 | 5% | 310 | 619 | 4% |
| Heat pump | 3098 | 55% | 6185 | 6185 | 55% | 10339 | 10339 | 68% |
| Active convection heat exchange | 475 | 8% | 475 | 949 | 8% | 316 | 633 | 4% |
| Cooling tower | 41 | 1% | 41 | 83 | 1% | 112 | 224 | 1% |
| Dehumidifying and heating | 930 | 16% | 930 | 1860 | 16% | 930 | 1860 | 12% |
| Sub-total | 4854 | 86% | 9696 | | 86% | 13675 | | 90% |
| Total (GJ/ha/year) | 5646 | 100% | | | | | | |
| Efficiency electricity | | | | | | | | |
| Primary (GJ/ha/year) | 50% | | 50% | | | 50% | | |
| | 11291 | | 11280 | 100% | | 15259 | 100% | |

TABLE 7-continued

Energy consumption of the closed greenhouse for
three configurations of heat pump; in relation
to the energy consumption in a traditional open
greenhouse

| | Electric heat pump Elect. | Heat and power + heat pump Elect. primary | Gas-fired absorption heat pump Elect. primary |
|---|---|---|---|
| Primary energy consumption closed greenhouse (aeq/m²/year) | | | |
| Primary energy consumption reference greenhouse (aeq/m²/year) | 35.8 | 35.6 | 48.2 |
| Difference | | | |
| | 61.5 | 61.5 | 61.5 |
| | −42% | −42% | −22% |

[1]Filling of the day buffer is part of the circuit with the aquifer

With the use of an electric heat pump the reduction in the primary energy consumption is about 42%. The method of delivery of the electricity from the mains electricity or from a gas motor herein has hardly any influence on the primary energy consumption, assuming the given basic principles.

When a gas-fired absorption heat pump is used, the reduction in the primary energy consumption is about 22%. The energy saving is much lower than with the use of a compressor heat pump because the efficiency (PER) of an absorption heat pump is lower than that of a compressor heat pump (assuming the given basic principles).

The extra investment cost of an air conditioning plant of a closed greenhouse with a gas-fired absorption heat pump were not determined.

Alternative Variants

Possible alternatives to the basic concept are:

Greenhouse Deck with Low Heat Access (ZTA) and High Light Access (LTA)

The heat surplus in the summer can be limited by applying glass with a low ZTA and a high LTA. The transmission spectrum of the glass must however correspond with the spectrum for the growth of the crop. Possible reduction in the light incidence will have to be compensated by better culture conditions in respect of $CO_2$ and moisture management (%RH).

Heating and Cooling from the Day Buffers

During a period in which cooling and heating are required within a space of 24 hours, use can be made of the day buffers. The heat demand in the morning is supplied from the warm day buffer, whereafter the cooled water is stored in the cold day buffer. This cold water can be used during the day to cool the greenhouse. The thus warmed water is stored once again in the warm day buffer.

This method of heating and cooling decreases energy consumption for pumping from and to the aquifer. The possible energy-saving has not yet been calculated. In addition, the interaction with the aquifer has not yet been investigated.

Cooling with Gas-fired Heat Pump and Storage of Heat at Higher Temperature

In order to limit the flow rate and the storage volume on the warm side of the day storage and the aquifer, the heat can also be stored at a temperature higher than 18° C. In that case the cooling of the greenhouse is provided by a gas-fired absorption heat pump or a gas motor/compressor heat pump. The heat will be stored at a temperature which is afterwards immediately suitable for heating (40 to 50° C.).

An advantage of cooling with a gas-fired heat pump is that there is a production of $CO_2$ at the moment when there is a great demand for $CO_2$. The generated heat can be stored in the warm day buffer or the aquifer. A drawback is that the surplus heat increases in the summer, and this surplus must then be removed again by cooling in the winter. This drawback is partly obviated if the surplus heat can be supplied to a third party.

Application in Other Climate and Other Geological Conditions

The principle of applying communicating day buffers in combination with seasonal storage can also be employed in conditions other than in the Netherlands.

A Dry and Warm Climate Such as in Southern Europe

Removal of the daily heat surplus by cooling in the summer can possibly be carried out in such a climate by means of larger day buffers in combination with a relatively small seasonal storage. If there is a relatively low air humidity in the night during the months in which there is a great heat supply during the day, the surplus can be removed by cooling in the night. Unnecessary storage and cooling in the cold months is hereby avoided.

A Colder Climate Such as in Northern Europe

If there is an annual heat deficit, the application of a gas-fired absorption heat pump is more attractive. There will then be no additional cooling in the winter, or hardly so, so that all heat, the seasonal surplus and the heat from the natural gas is used by the greenhouse.

No Aquifer Available

In regions where no aquifers are available, it will be possible to apply seasonal storage in the form of ground heat exchangers. Because the storage output and the storage capacity is smaller than with the use of an aquifer, the field of application is limited. Situations where the insolation is limited by climatological conditions or by the exclusion of the greatest insolation increase the chances of applying ground heat exchangers.

Exchange with the Environment

A closed greenhouse system can exchange energy with the immediate vicinity. This immediate vicinity can be formed by surrounding market garden greenhouses, houses and industrial estates. Exchange can relate for instance to the annual heat surplus or the supply of surplus electricity if use is made of a gas motor with generator.

In respect of the water management in the greenhouse, particularly in countries where fossil water is used, a closed market garden greenhouse can be utilized to prevent exhaustion of the water sources. Given the other climatological conditions, an additional study will have to be carried out here to arrive at a correct dimensioning of the different components within the described concept of climate control.

Example

Basic Principles of the Calculation Model

The calculation model is based on the TestReferenceYear (TRY) of De Bilt.

Calculations were made with the hourly values of the outside temperature, insolation (direct and indirect) and the relative air humidity.

The assumptions in the calculation model are:

| Energy principles | |
|---|---|
| Reference | |
| Heat deficit | 15824 GJ/ha/yr |
| efficiency HE-boiler | 100% |
| auxiliary energy water pumps | 1.5% |
| Peak demand | 220 W/m² |
| primary energy consumption | 16299 GJ/ha/year |
|  | 51.5 m³/ha/year |
| General | |
| efficiency central electricity generation | 50% |
| Greenhouse temperature | 20° C. |
| energy content natural gas (ow) | 31.65 MJ/m³ |
| Heat pump | |
| electrical compressor heat pump | 50% of Carnot-efficiency |
| COP | |
| gas-fired absorption heat pump | 150% fixed value |
| PER | |
| Gas motor | |
| efficiency heat | 50% |
| efficiency electricity | 40% |
| Heat losses | 16% |
| SPF | 495% |
| Generator | |
| Generating efficiency | 90% |
| Cooling | |
| active convection | |
| Auxiliary energy | 2% of Q-thermal |
| Heating | |
| active convection | |
| Auxiliary energy | 3% of Q-thermal |
| Dehumidification | |
| removal to aquifer | 0.3 MJ/kg H₂O |
| dehumidifying and heating | 0.8 MJ/kg H₂O |
| quantity to be removed | 640 kg/m²/year |
| condensation on greenhouse deck | 175 kg/m²/year |
| as part of latent heat | 465 kg/m²/year |
| additional removal | 116.25 kg/m²/year |
| CO2-delivery in reference greenhouse | |
| additional feed | 10 m³/m²/year |
| Energy consumption | 3165 GJ/ha/yr |
| Ventilation | |
| temperature supply | 16° C. |
| pressure drop over inlet filter | 100 Pa |
| pressure drop over outlet path | 100 Pa |
| efficiency air pump | 50% |

| -continued | |
|---|---|
| Energy principles | |
| Storage | |
| Aquifer | |
| efficiency groundwater pump | 80% |
| efficiency storage | 90% |
| Ground heat exchanger | |
| efficiency storage | 90% |
| Cooling tower | |
| T-in | 20° C. |
| T-out | 8° C. |
| Auxiliary energy | 1% of cooling output |
| Heat exchanger | |
| Temperature difference | |
| Water/air | 5° C. |
| Water/water | 2° C. |

The invention is not limited to the above description; the rights sought are defined by the following claims.

What is claimed is:

1. A market garden greenhouse system in which plant products can be cultivated, the system comprising:
   a closed greenhouse;
   heat regulating means for regulating the heat in the greenhouse, which heat originates substantially from solar energy, the heat regulating means in turn comprising a heat exchanger, and an energy store in turn comprising an aquifer comprising a cold water source and a warm water source, and one or more buffers characterized in that:
   the cold water source is connected to the heat exchanger;
   the warm water source is also connected to the heat exchanger; and
   a first day buffer is connected to the heat exchanger and the greenhouse, and a second day buffer is also connected to the heat exchanger and the greenhouse, which day buffers are arranged between the aquifer and the greenhouse.

2. A market garden greenhouse system according to claim 1, wherein the heat regulating means comprises one or more means selected from the group consisting of heating means, cooling means, and the energy store.

3. A market garden greenhouse system according to claim 2, wherein one or more of the heating means, the cooling means and air humidity regulating means comprise one or more heat exchanger.

4. A market garden greenhouse system according to claim 1, additionally comprising air humidity regulating means.

5. A market garden greenhouse system according to claim 1, wherein the day buffers are underground water basins.

6. A market garden greenhouse system according to claim 1 comprising one or more water pumps for pumping cooled or heated water between the day buffers, aquifer and heat exchangers.

7. A market garden greenhouse system according to claim 1 comprising energy removing means for removing a surplus of heat energy.

8. A method for controlling climate in a closed market garden greenhouse, comprising:
   the step of storing solar energy which comes into contact with the market garden greenhouse in an underground water basin which is connected to the greenhouse; and the step of controlling this stored energy in order to regulate the heat and air humidity in the greenhouse by storing cold in a cold day buffer during the night and using the cold to extract heat from the greenhouse during the day, which heat is stored in a warm day buffer.

9. A method according to claim 8, wherein the controlling step comprises extracting heat from the greenhouse during the day using both cold from the cold day buffer and cold from the aquifer.

* * * * *